US012608009B2

(12) United States Patent
Opitsch

(10) Patent No.: US 12,608,009 B2
(45) Date of Patent: Apr. 21, 2026

(54) METHOD AND CONTROL SYSTEM FOR CONTROLLING A WIRED VEHICLE FLEET

(71) Applicant: AGCO International GmbH, Neuhausen (CH)

(72) Inventor: Bernd Opitsch, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 378 days.

(21) Appl. No.: 18/318,577

(22) Filed: May 16, 2023

(65) Prior Publication Data
US 2023/0409047 A1 Dec. 21, 2023

(30) Foreign Application Priority Data
Jun. 15, 2022 (GB) ..................................... 2208761

(51) Int. Cl.
G05D 1/00 (2024.01)
(52) U.S. Cl.
CPC ......... G05D 1/0289 (2013.01); G05D 1/0214 (2013.01); G05D 1/0291 (2013.01)
(58) Field of Classification Search
CPC .. G05D 1/0289; G05D 1/0214; G05D 1/0291; B64U 70/93; B64U 10/60; B64U 2101/45; B64U 2201/202; B64U 2101/40; B65H 75/425; H02G 11/006; B60L 2200/10; B60L 2260/32; B60L 2260/44; B60L 1/003; B60L 3/0023; B60L 9/00; B60L 2200/40; A01B 76/00
See application file for complete search history.

(56) References Cited

U.S. PATENT DOCUMENTS

| 10,145,356 | B1 | 12/2018 | Nordstrom et al. | |
| 11,358,687 | B1 * | 6/2022 | Barnawi | G01S 15/586 |
| 2013/0233964 | A1 * | 9/2013 | Woodworth | B64U 10/60 |
| | | | | 244/175 |
| 2016/0318607 | A1 * | 11/2016 | Desai | A01M 7/00 |
| 2017/0291704 | A1 * | 10/2017 | Alegria | G08G 5/55 |

OTHER PUBLICATIONS

UK Intellectual Property Office, Search report for related UK Application No. GB2208761.3, dated Dec. 14, 2022, 3 pages.

* cited by examiner

*Primary Examiner* — Scott A Browne
*Assistant Examiner* — Lidia Kwiatkowska

(57) ABSTRACT
A wired vehicle fleet having a first vehicle connected with a supply unit by a first bendable connection element and a second vehicle connected with the supply unit by a second bendable connection element is controlled by a control unit to avoid a collision between the first and the second bendable connection elements.

16 Claims, 9 Drawing Sheets

M1

METHOD AND CONTROL SYSTEM FOR CONTROLLING A WIRED VEHICLE FLEET

FIELD

The present disclosure relates generally to a method and a control system for controlling a wired vehicle fleet. The vehicle fleet may comprise several vehicles each connected to a supply unit for supplying the vehicles with energy or any other resources.

BACKGROUND

U.S. patent application 2020/0298641 A1, "Current supply system for a team of vehicles," published on Sep. 24, 2020, discloses a vehicle fleet of three vehicles connected by a connection element such as a wire. One of the three vehicles operates as a leading vehicle. The other two vehicles follow the leading vehicle. To avoid a collision with one of the connection elements a proper operation of the vehicle fleet needs to be ensured.

BRIEF SUMMARY

It is an objective to coordinate the operation of the vehicles of a vehicle fleet so that a collision of a connection element with another connection element or with one of the vehicles is avoided.

According to an aspect of the invention there is provided a control system for controlling a wired vehicle fleet. The control system includes a supply unit, a first vehicle connected with the supply unit by a first bendable connection element, a second vehicle connected with the supply unit by a second bendable connection element and a control unit. The control unit is configured to carry out any steps of the methods described below.

The first and the second vehicle may be an agricultural vehicle such as a tractor, a sprayer, a combine, a harvester or a drone. The first and the second vehicle may comprise an implement such as a mover, a plough or a trailer. The supply unit may be a stationary entity or a vehicle such as for example the first or the second vehicle. The supply unit may be equipped with an energy storage or a tank to store (electrical) energy or any other resources. The first and the second vehicle may be supplied by the supply unit with energy, e. g. electrical energy or fuel, or any other resource, e. g. fertilizer or pesticides, through the bendable connection elements.

The control system may also include a floating unit for carrying the first or the second bendable connection element in the air.

The floating unit may be a flying object such as a drone or a balloon. The floating unit may be attached to one of the bendable connection elements and may lift the bendable connection element to reduce the slack or to reduce a pulling force in the bendable connection element, as for example a floating unit as disclosed in the GB patent application, application number 2205518.0, "Supply system for a vehicle connected to a platform", filed on Apr. 13, 2022 by the applicant, which is hereby incorporated by reference in its entirety.

The first or the second bendable connection element may be a pipe for supplying a fluid.

Alternatively, the first or the second bendable connection element may be a wire for transferring electrical energy or a combination of a wire and a pipe. The fluid may be water, a pesticide or a fertilizer. While the fluid is transferred from the supply unit to the first or the second vehicle the fluid may be dispensed by the first or the second vehicle for treating crops of an agricultural field.

At least one of the first vehicle, the second vehicle and the supply unit may include a height variable mast for connecting the first or the second bendable connection element.

The height variable mast may comprise a telescopic extendable element controllable by the control unit. The height variable mast may be mounted on a roof of the supply unit, the first vehicle or the second vehicle.

The first vehicle may include a first height variable mast connected with the first bendable connection element for adjusting the maximum height of the first bendable connection element, the second vehicle may include a second height variable mast connected with the second bendable connection element for adjusting the maximum height of the second bendable connection element. The control unit may be configured to adjust a maximum height of each of the first and second bendable connection elements so that the maximum height of the bendable connection element of the one of the first and second vehicle being closer to the supply unit is below the minimum height of the bendable connection element of the other vehicle being more distant from the supply unit.

I. e., the bendable connection elements are arranged in a cascading arrangement to avoid a collision between two bendable connection elements. The height of a bendable connection element connected to the vehicle being more distant from the supply unit is higher than the height of a bendable connection element connected to the vehicle being closer to the supply unit so that the bendable connection element of the vehicle being more distant from the supply unit may span over the bendable connection element of the vehicle being closer to the supply unit. Thus a collision between the first and the second bendable connection element may be avoided.

A further aspect provides a first method for controlling a wired vehicle fleet including a first vehicle connected with a supply unit by a first bendable connection element and a second vehicle connected with the supply unit by a second bendable connection element. The method includes the steps of determining a minimum and a maximum height of the first bendable connection element, determining a minimum and a maximum height of the second bendable connection element, determining a first wayline of the first vehicle and determining a second wayline of the second vehicle depending on the heights of the first and second bendable connection element.

The maximum height of the first bendable connection element may be defined by the connection points of the first bendable connection element with the first vehicle and the supply unit. The maximum height of the second bendable connection element may be defined by the connection points of the second bendable connection element with the second vehicle and the supply unit. Both heights may be predefined values stored in the control unit as parameters. The minimum height of the first bendable connection element may depend on a slack of the first bendable connection element connected between the first vehicle and the supply unit. The minimum height of the second bendable connection element may depend on a slack of the second bendable connection element connected between the second vehicle and the supply unit. The slack of each bendable connection element may depend on the length of the corresponding bendable connection element and may be calculated by the control unit.

The waylines of the first and second vehicle may be determined by the control unit based on a path planning algorithm stored in a memory of the control unit. Since the wayline of the second vehicle depends on the height of the first and the second bendable connection element the control unit may determine a second wayline for which a collision between the first and the second bendable connection element may be avoided when the first and the second vehicle move along their corresponding first and second waylines.

The second wayline may run between the first wayline and a location of the supply unit if the minimum height of the first bendable connection element is higher than the maximum height of the second bendable connection element. The first wayline may run between the second wayline and the location of the supply unit if the maximum height of the first bendable connection element is lower than the minimum height of the second bendable connection element.

Both, in the one and in the other case, the control unit determines the second wayline of the second vehicle depending on the height of the first and second bendable connection element. Additionally, the control unit determines a second wayline for which a collision between the first and the second bendable connection element may be avoided when the first and the second vehicle move along their corresponding first and second waylines. Hence, the first and the second bendable connection elements may be arranged in a cascading arrangement as described above.

The method may also include the step of determining a third wayline of the supply unit. Then, the location of the supply unit may be defined by the third wayline.

The control unit may determine the third wayline if the supply unit is a vehicle. The supply unit may move along the third wayline. The first, the second and the third wayline may be aligned parallel to each other so that the first, the second and the third vehicle may move parallel to each other, too. Additionally, the second wayline may run between the first wayline and the third wayline if the minimum height of the first bendable connection element is higher than the maximum height of the second bendable connection element. The first wayline may run between the second wayline and the third wayline if the maximum height of the first bendable connection element is lower than the minimum height of the second bendable connection element.

Another aspect includes a second method for controlling a wired vehicle fleet including a first vehicle connected with a supply unit by a first bendable connection element and a second vehicle connected with the supply unit by a second bendable connection element. The method includes the steps of determining a first wayline of the first vehicle, determining a second wayline of the second vehicle, determining a first safety zone in consideration of a length of the first bendable connection element and a minimum and a maximum height of the first bendable connection element, determining a second safety zone in consideration of a length of the second bendable connection element and a minimum and a maximum height of the second bendable connection element, anticipating variations of the first safety zone based on anticipated positions of the first vehicle moving along the first wayline, anticipating variations of the second safety zone based on anticipated positions of the second vehicle moving along the second wayline, anticipating a collision of the first bendable connection element with the second bendable connection element if an anticipated variation of the first safety zone intersects an anticipated variation of the second safety zone.

The first safety zone may be a virtual zone and may cover the first bendable connection element. Analogously, the second safety zone may be a virtual zone and may cover the second bendable connection element. The first and the second safety zone may be determined by the control unit and may be of any shape, for example a three dimensional object as a cuboid enclosing the corresponding bendable connection element or a bent tube surrounding the corresponding bendable connection element.

The control unit may anticipate the positions of the first and the second vehicle moving along their waylines based on their speed. Since the first bendable connection element is connected with the first vehicle and the second bendable connection element is connected with the second vehicle the first and the second bendable connection elements will follow the movement of the first and the second vehicle accordingly. Then, the control unit may anticipate the variations of the first and second safety zone based on the anticipated positions of the first and the second vehicle and the (anticipated) position of the supply unit. Based on the anticipated variations of the first and second safety zone the control unit may determine a possible collision between the first bendable connection element and the second bendable connection element before a real collision occurs.

The second method may include the steps of determining a third wayline of the supply unit and anticipating variations of the first safety zone and the second safety zone based on anticipated positions of the supply unit moving along the third wayline.

Thus, the control unit may anticipate the positions of the supply unit, the first and the second vehicle moving along their waylines based on their speed. Since the first bendable connection element and the second bendable connection element are connected with the supply unit the first and the second bendable connection elements will follow the movement of the supply unit accordingly. Then, the control unit may also consider the movement of the supply unit for anticipating the variations of the first and second safety zone.

The second method may also include the step of determining an alternative wayline of the supply unit if a collision of the first bendable connection element with the second bendable connection element is anticipated.

The second method may also include the step of determining an alternative wayline of the second vehicle if a collision of the first bendable connection element with the second bendable connection element is anticipated.

When the control unit determines an alternative wayline of the supply unit or an alternative wayline of the second vehicle the control unit may consider the height of the first and second bendable connection element to determine a wayline for which a collision between the first and the second bendable connection element may be avoided when the supply unit, the first and the second vehicle move along their corresponding waylines.

The second method may also include the step of carrying out at least one step of the first method if a collision of the first bendable connection element with the second bendable connection element is anticipated.

Thus, the control unit may determine a first wayline of the first vehicle and a second wayline of the second vehicle depending on the height of the first and second bendable connection element. The control unit may determine a new first wayline of the first vehicle or a new second wayline of the second vehicle if a first wayline or a second wayline was determined before.

The method may also include the step of adjusting the height of the first or the second bendable connection element.

The control unit may arrange the minimum height of the bendable connection element of the first vehicle above the maximum height of the bendable connection element of the second vehicle if the second wayline runs between the first wayline and a location of the supply unit by lowering or raising at least one of the height variable masts of the first and second vehicle. The control unit may arrange the minimum height of the bendable connection element of the second vehicle above the maximum height of the bendable connection element of the first vehicle if the first wayline runs between the second wayline and a location of the supply unit by lowering or raising at least one of the height variable masts of the first and second vehicle. According to this adjustment of the first or second bendable connection element a collision between the first and the second bendable connection element may be avoided.

The method may also consider a size of the first vehicle for the determination of the first safety zone and may also consider a size of the second vehicle for the determination of the second safety zone.

I. e., the first safety zone may enclose the first bendable connection element and the first vehicle; the second safety zone may enclose the second bendable connection element and the second vehicle. Thus, a collision between the first vehicle and the second bendable connection element or a collision between the second vehicle and the first bendable connection element may be anticipated by the control unit if an anticipated variation of the first safety zone intersects an anticipated variation of the second safety zone.

The method may also consider a third safety zone for the supply unit. The third safety zone may be part of the first or second safety zone.

The control unit of the control system may be configured to determine the maximum height of the first or the second bendable connection element in consideration of a floating height of the floating unit or a size of the floating unit.

Hence, the control unit may determine the first safety zone or the second safety zone in consideration of a position or a size of the floating unit. The floating unit may be enclosed by the first or second safety zone so that a collision of the floating unit with a bendable connection element may be anticipated by the control unit.

The floating unit may include an envelope for enclosing a gas volume.

The envelope avoids a dissipation of the gas. The gas may be a fluid lighter than air such as helium for causing a lifting effect to carry the bendable connection element in the air.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

Several aspects of the invention will now be described, by way of example only, with reference to the accompanying drawings, in which.

DETAILED DESCRIPTION

Figure 1:
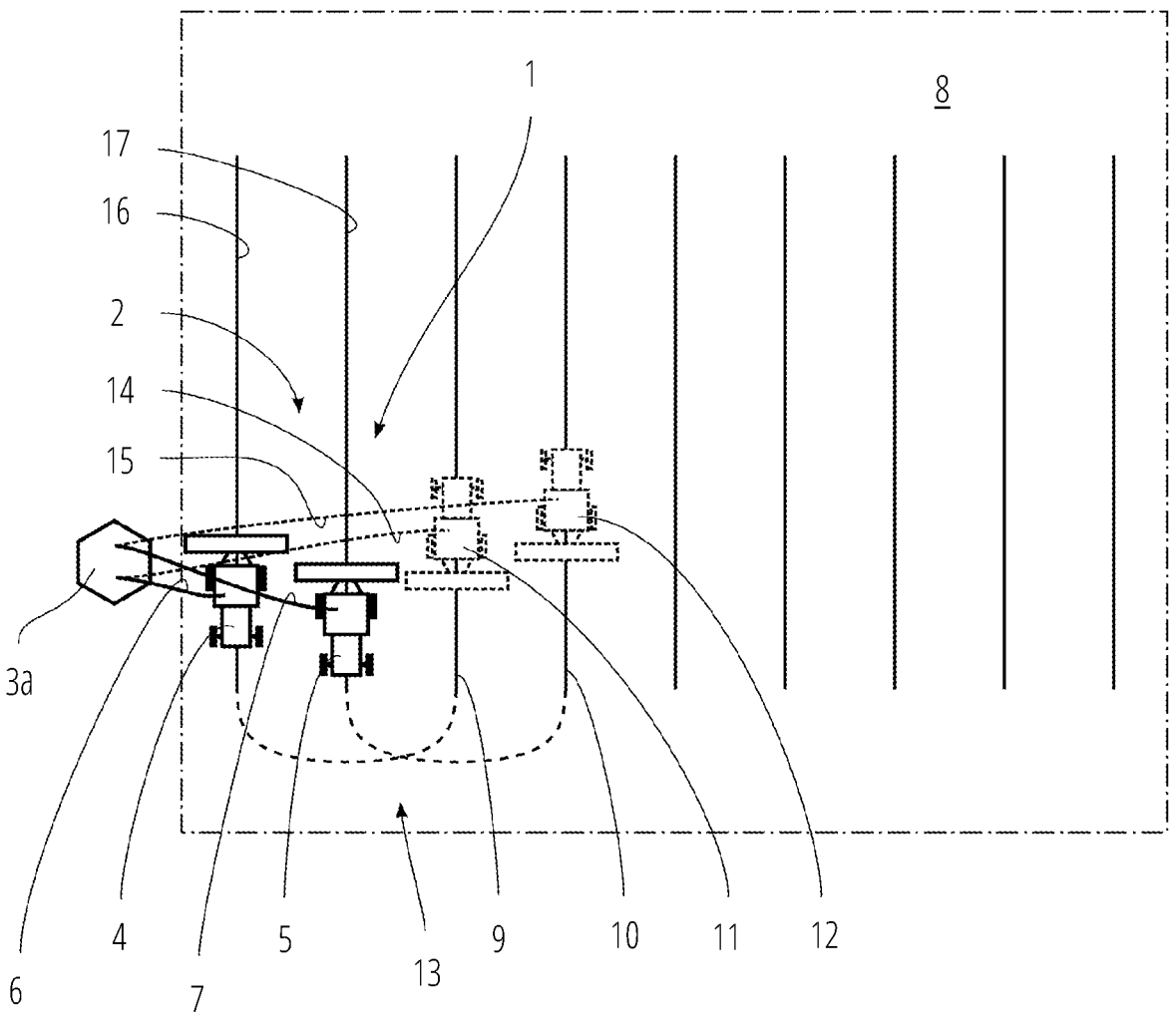
FIG. 1 illustrates a control system for controlling a wired vehicle fleet.
Figure 2:
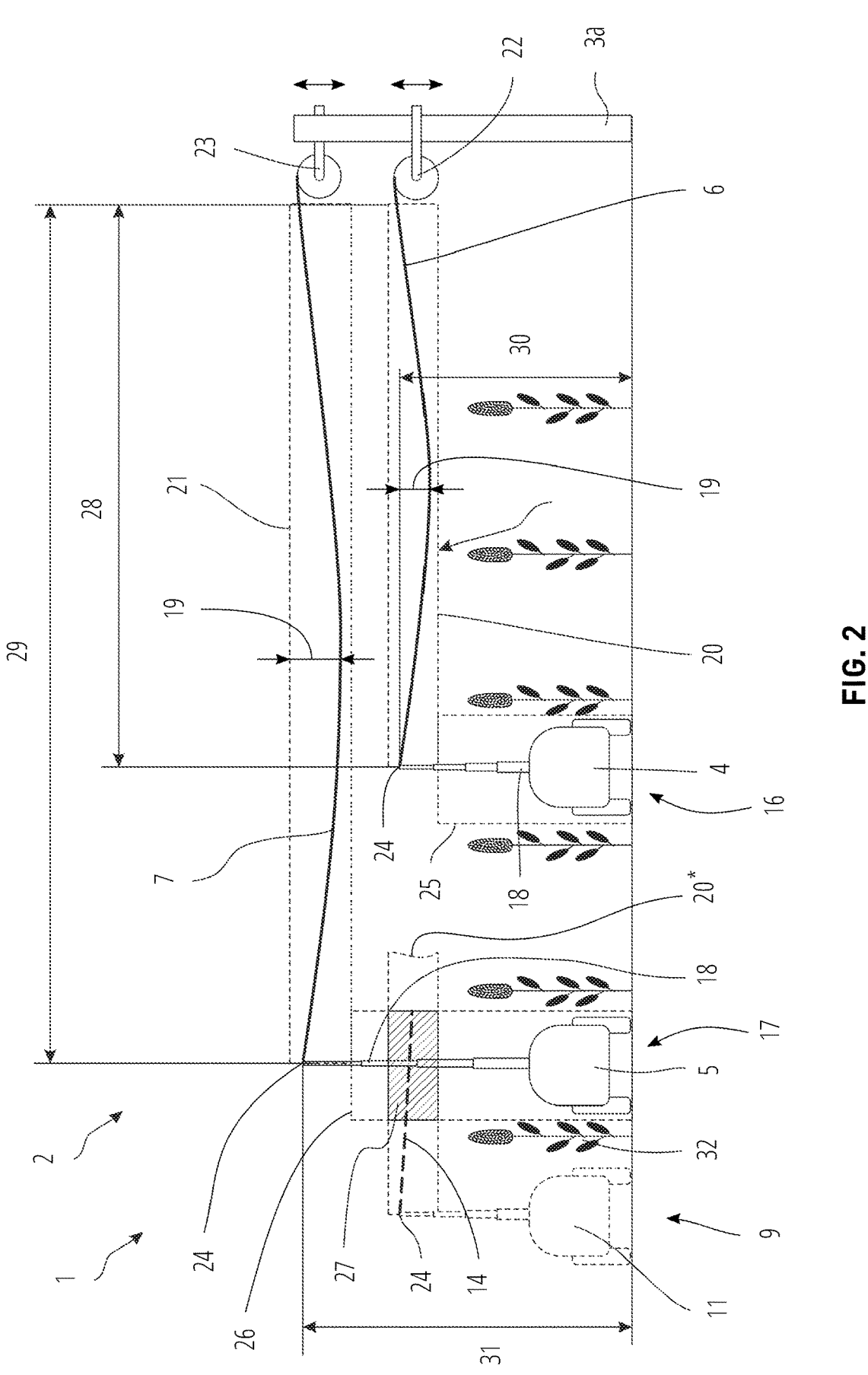
FIG. 2 illustrates a control system for controlling a wired vehicle fleet with safety zones covering bendable connection elements.

FIG. 1 and FIG. 2 show a control system 1 for controlling a wired vehicle fleet 2 comprising a supply unit 3a, a first vehicle 4 connected with the supply unit 3a by a first bendable connection element 6 and a second vehicle 5 also connected with the supply unit 3a by a second bendable connection element 7. The first vehicle 4 and the second vehicle 5 of the vehicle fleet 2 are operating in an agricultural field 8. The first vehicle 4 moves along a wayline 16 and the second vehicle 5 moves along a wayline 17. At the end of the waylines 16 and 17 the first vehicle 4 and the second vehicle 5 may turn in a headland 13 of the agricultural field 8 so that the first vehicle 4 will continue to move along a first wayline 9 and the second vehicle 5 will continue to move along a second wayline 10.

The supply unit 3a is a stationary entity such as a container. The supply unit 3a is placed at a corner of the agricultural field 8 so that the first and the second vehicle 4 and 5 can easily pass the stationary supply unit 3a when moving along their waylines in the agricultural field 8.

While the first and second vehicles 4 and 5 are operating in the agricultural field 8 the first and second vehicles 4 and 5 stay connected with the supply unit 3a by their first and second bendable connection elements 6 and 7. The lengths 28 and 29 of the first and the second bendable connection element 6 and 7 may be adjustable to prevent a break of the bendable connection elements 6 and 7 when the first and second vehicle 4 and 5 are getting away from the supply unit 3a. For example, the supply unit 3a may comprise a winch 22 for the bendable connection element 6 and a winch 23 for the bendable connection element 7 to adjust separately the lengths 28 and 29 by unwinding or winding up of the bendable connection elements 6 and 7.

Figure 5:
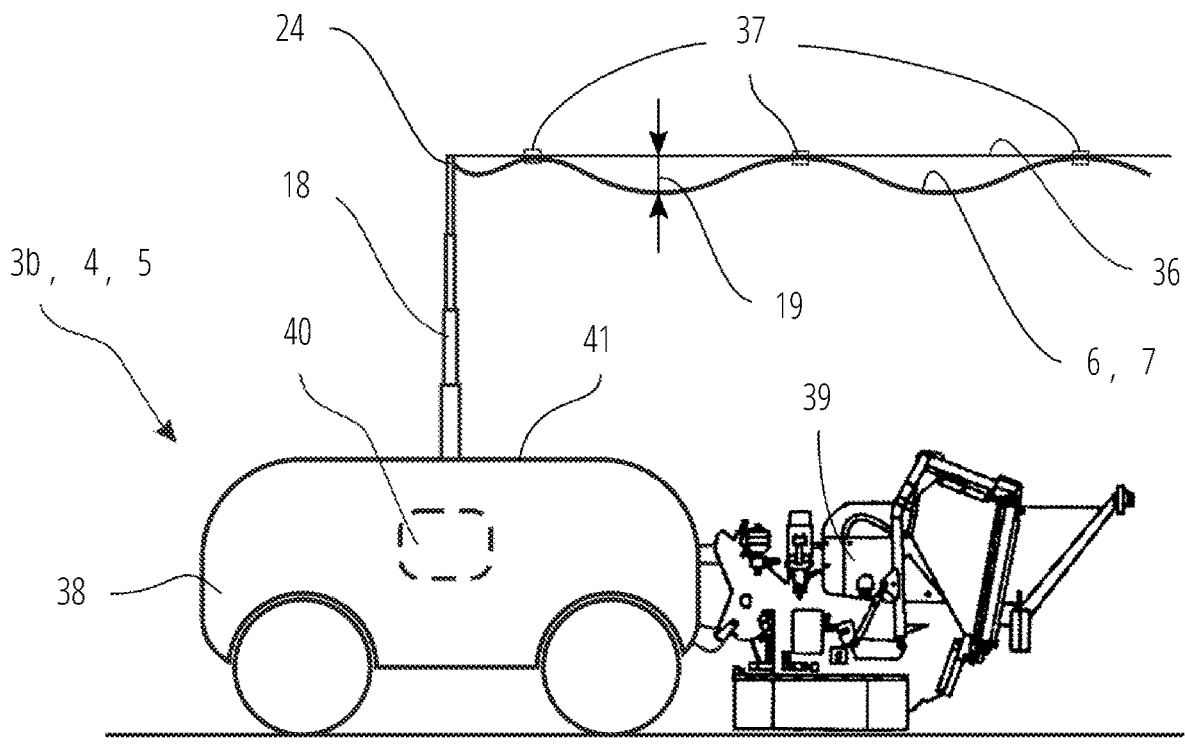
FIG. 5 is a simplified view of an agricultural vehicle as part of the vehicle fleet.

As can be seen in FIG. 2, one end of the first bendable connection element 6 is connected to the winch 22 and the other end of the first bendable connection element 6 is connected to a distal end 24 of a height variable mast 18 of the first vehicle 4 (see also FIG. 5). Analogously, one end of the second bendable connection element 7 is connected to the winch 23 and the other end of the first second bendable connection element 7 is connected to a distal end 24 of a height variable mast 18 of the second vehicle 5 (see also FIG. 5). The heights of the winch 22 and winch 23 are adjustable, too. Hence, the height of the first and the second bendable connection element 6 and 7 are adjustable by adjusting the height of the corresponding mast 18 or the winch 22, 23.

The first bendable connection element 6 as well as the second bendable connection element 7 may comprise each a slack 19. The slack 19 may depend on the corresponding lengths 28 and 29 between the one end and the other end of the first and second bendable connection element 6 and 7.

The first bendable connection element 6 may be covered by a first safety zone 20 and the second bendable connection element 7 may be covered by a second safety zone 21 as explained later on.

Crop 32 growing on the agricultural field 8 may be treated by the first vehicle 4 and the second vehicle 5 such as spraying, weeding or mowing between the rows of crop 32.

Figure 3:
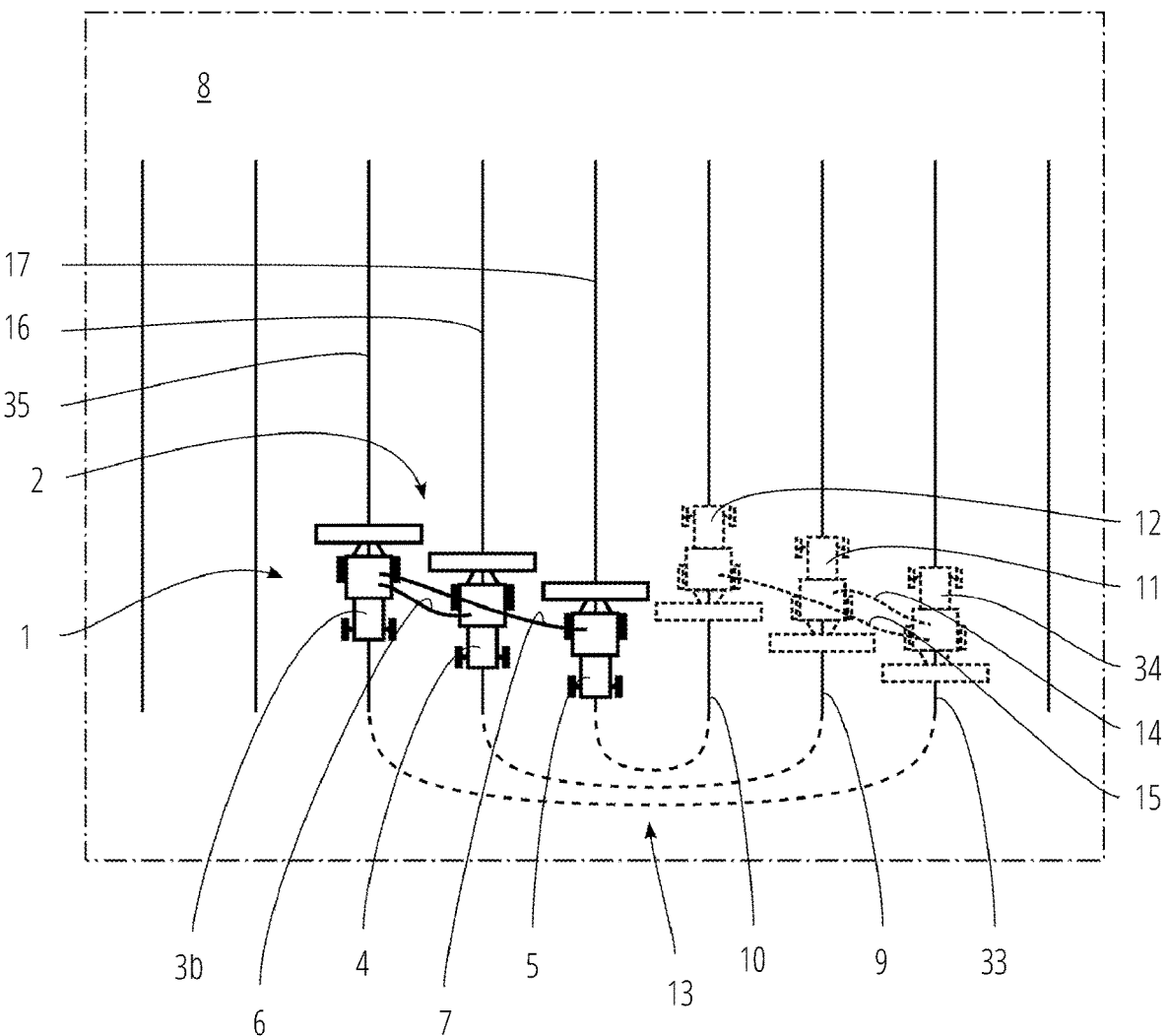
FIG. 3 illustrates a control system for controlling a wired vehicle fleet with a moveable supply unit.
Figure 4:
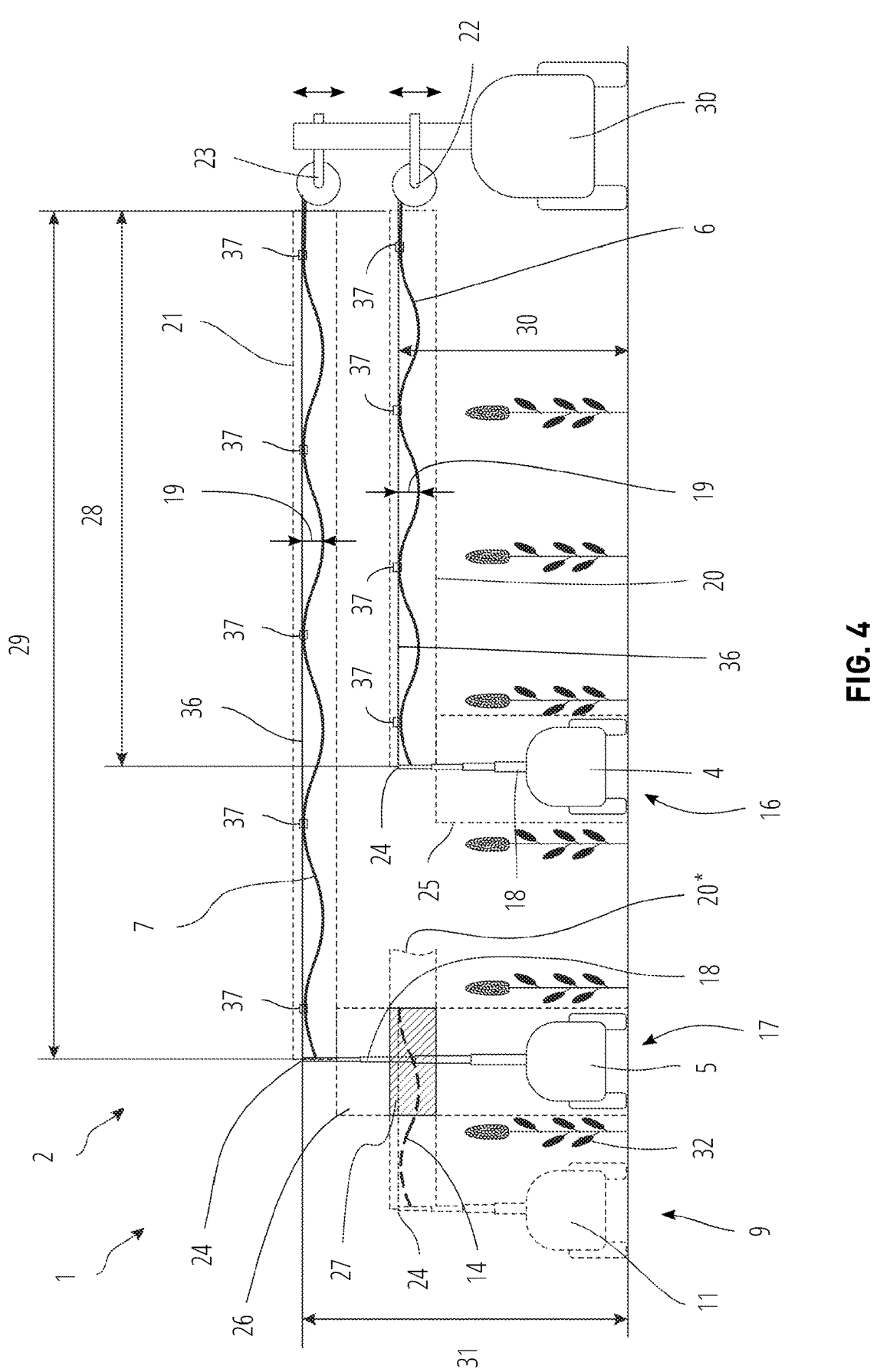
FIG. 4 illustrates a control system for controlling a wired vehicle fleet with safety zones covering bendable connection elements fixed to carrier ropes.

FIG. 3 and FIG. 4 show also a control system 1 for controlling a wired vehicle fleet 2 comprising a supply unit 3b, a first vehicle 4 connected with the supply unit 3b by a first bendable connection element 6 and a second vehicle 5 also connected with the supply unit 3b by a second bendable connection element 7.

The control system 1 of FIG. 3 and FIG. 4 may be the same as of FIG. 1 and FIG. 2 except for the stationary supply unit 3a. In contrast to the stationary supply unit 3a, the supply unit 3b shown in FIG. 3 and FIG. 4 is a movable entity such as a vehicle. For example, the supply unit 3b may be a vehicle of the same type as the first or the second vehicle 4 or 5. I. e., the vehicle fleet 2 shown in FIG. 3 and FIG. 4 comprises three agricultural vehicles which may operate in a cooperative manner in the agricultural field 8.

The supply unit 3a illustrated in FIG. 1 and FIG. 2 as well as the supply unit 3b illustrated in FIG. 3 and FIG. 4 may comprise the same components as for example a energy storage and a tank for resources needed for the field operation. The energy storage may be a battery for storing electrical energy. The tank may comprise several tanks for example to store fuel for propelling the vehicles of the vehicle fleet 2 or agents such as fertilizers or pesticides to be dispensed on crops of the agricultural field 8 by the vehicles of the vehicle fleet 2. The electrical energy and the resources may be transferred from the supply unit 3a or 3b to the first and second vehicle 4 and 5 through the corresponding first and second bendable connection elements 6 and 7 the first and second vehicle 4 and 5 are connected with.

The first and the second bendable connection element 6 and 7 may comprise a wire, a pipe or both for transferring the electrical energy or the resources. The wire may also be used to transfer data or signals between the supply unit 3a, 3b and the vehicles 4, 5.

As shown in FIG. 3, the first vehicle 4 moves along a wayline 16 and the second vehicle 5 moves along a wayline 18 analogously to FIG. 1. Additionally, the supply unit 3b moves along a wayline 35. At the end of the waylines 16, 17 and 35, the first vehicle 4, the second vehicle 5 and the supply unit 3b may turn in a headland 13 of the agricultural field 8 so that the first vehicle 4 will continue to move along a first wayline 9, the second vehicle 5 will continue to move along a second wayline 10 and the supply unit 3b will continue to move along a third wayline 33.

Irrespectively that the winch 22 and winch 23 are connected with the moveable supply unit 3b instead of the supply unit 3a the heights of the first and second bendable connection element 6 and 7 are adjustable in an analogous manner as described above. But in contrast to FIG. 2, the first and the second bendable connection element 6 and 7 are fixed each to a carrier rope 36 by several fixations 37 to reduce the slack 19. (The control system 1 according to FIG. 1 and FIG. 2 may also be equipped with carrier ropes 36).

FIG. 5 shows an agricultural vehicle 38 connected with an implement 39 such as a mower to harvest or cut crop 32. The agricultural vehicle 38 may be of any type such as an agricultural robot, a tractor, a harvester, etc. The agricultural vehicle 38 may represent at least one of the first vehicle 4, the second vehicle 5 and the supply unit 3b. The agricultural vehicle 38 comprises a roof 41 on which a height variable mast 18 is mounted. A distal end 24 of the mast 18 is connected with the first bendable connection element 6 or the second bendable connection element 7. The height variable mast 18 may comprise a telescopic extendable element to raise or lower the distal end 24 of the mast 18 to adjust the height of the first or the second bendable connection element 6 or 7. As shown in FIG. 5, a carrier rope 36 may be optionally connected to the mast 18. The first or the second bendable connection element 6 or 7 may be connected to the carrier rope 36 by one or more fixations 37 for reducing a slack 19 of the bendable connection element. The more fixations 37 are used to connect the bendable connection element 6, 7 to the carrier rope 36 the more the slack 19 may be reduced.

At least one of the supply unit 3a, 3b, the first and the second vehicle 4 and 5 comprises a control unit 40. The control unit 40 may be integrated in the supply unit 3a shown in FIG. 1. The control unit 40 may be integrated in the agricultural vehicle 38 representing the supply unit 3b as shown in FIG. 3, FIG. 4 and FIG. 5. Alternatively, control unit 40 may be integrated in any of the first and second vehicle 4 and 5. More alternatively, the control unit 40 may be provided beyond supply unit 3a, 3b, the first and the second vehicle 4 and 5 and communicate with supply unit 3a, 3b, the first and the second vehicle 4 and 5 via cellular network or any other wireless communication.

Figure 6:
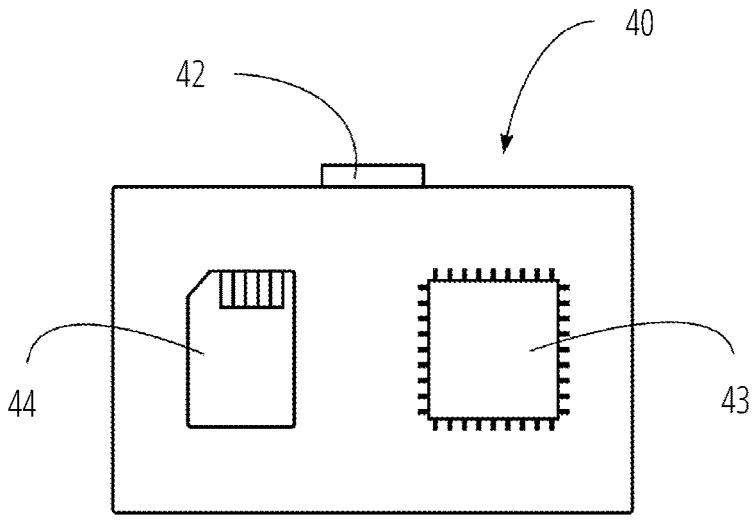
FIG. 6 illustrates simplified view of a control unit.

FIG. 6 shows the control unit 40 comprising an interface 42, a controller 43 and a memory 44. The control unit 40 may receive and send signals or data via the interface 42. The interface 42 may be a wireless interface or a connector. The interface 42 may additionally be provided to communicate wirelessly to further stationary or mobile devices to enable monitoring or planning of the wired vehicle fleet 2 by a human operator. The controller 43 may store the data or signals received by the control unit 40 in the memory 44. The memory 44 may contain additional data or executable programs, for example in terms of a computer-implemented method, that may be retrieved, processed or carried out by the controller 43. Data or signals resulting from the processing of data or signals or from the execution of a program may be stored to the memory 44 or sent to the interface 42 by the controller 43.

The first bendable connection element 6 and the second bendable connection element 7 may be connected to the interface 42 of the control unit 40. The control unit 40 may communicate with the first vehicle 4 and the second vehicle 5 through the corresponding bendable connection elements 6 and 7. Thus, the control unit 40 may control the vehicle speed or the steering of the first and the second vehicle 4 and 5 to move the first and the second vehicle 4 and 5 along their waylines. The control unit 40 may also control the implement 39 of the first and the second vehicle 4 and 5. In case of a moveable supply unit 3b the control unit 40 may also control the vehicle speed or the steering of the supply units 3b as well as any implement 39 connected to the supply unit 3b.

Figure 7:
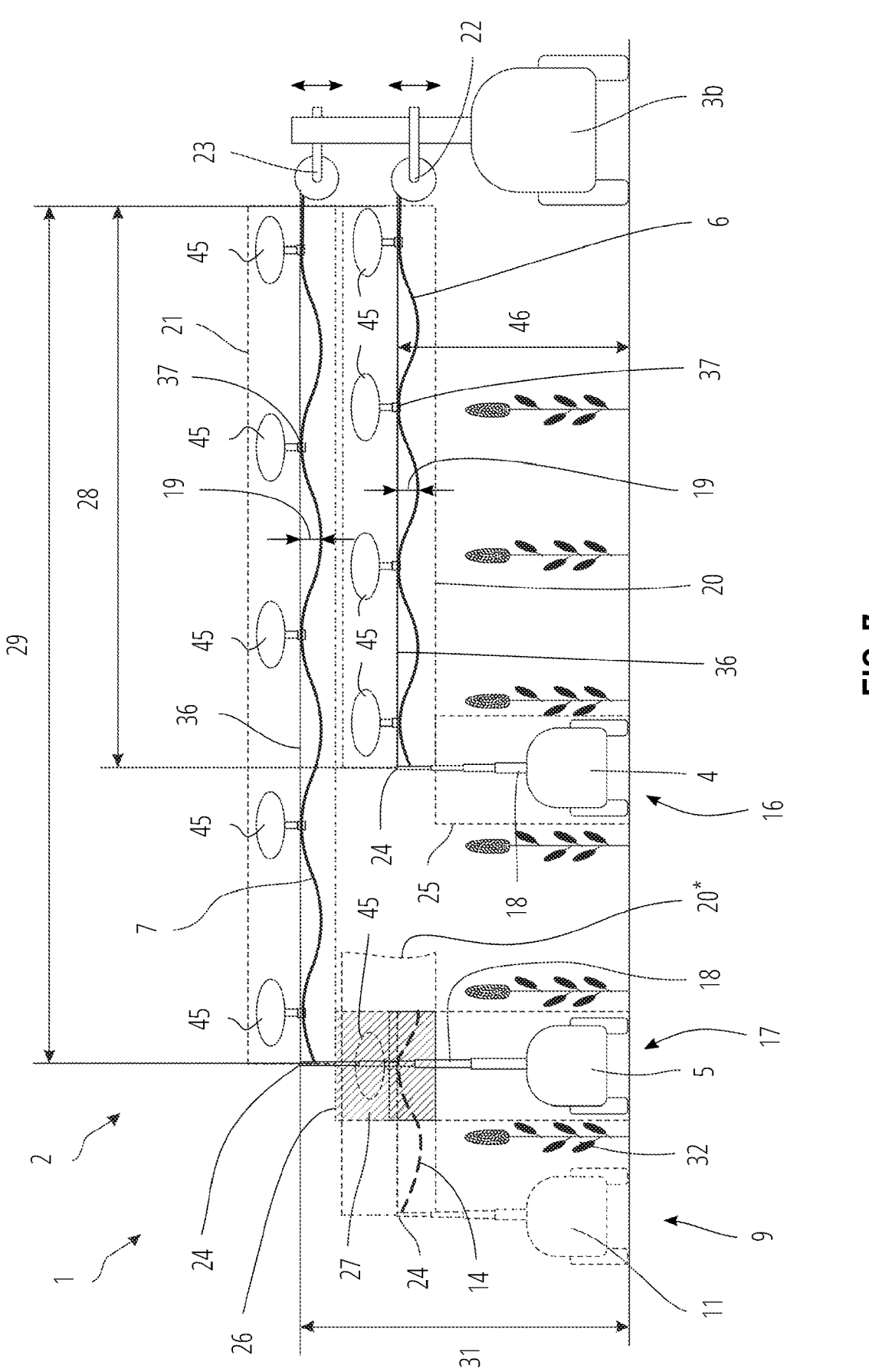
FIG. 7 illustrates a control system for controlling a wired vehicle fleet with safety zones covering bendable connection elements and floating units.

FIG. 7 shows the same control system 1 as shown in FIG. 4 wherein the first bendable connection element 6 and the second bendable connection element 7 are additionally equipped with at least one floating unit 45 for carrying the bendable connection elements in the air. The floating units 45 may be fixed to the fixations 37 and may comprise an envelope to enclose a gas volume. The gas volume may comprise a gas lighter than air as for example helium to provide a buoyancy force. The floating unit 45 may be of the same type and may have the same functionality as the floating unit described in the GB patent application, application number 2205518.0, mentioned above.

Figure 8:
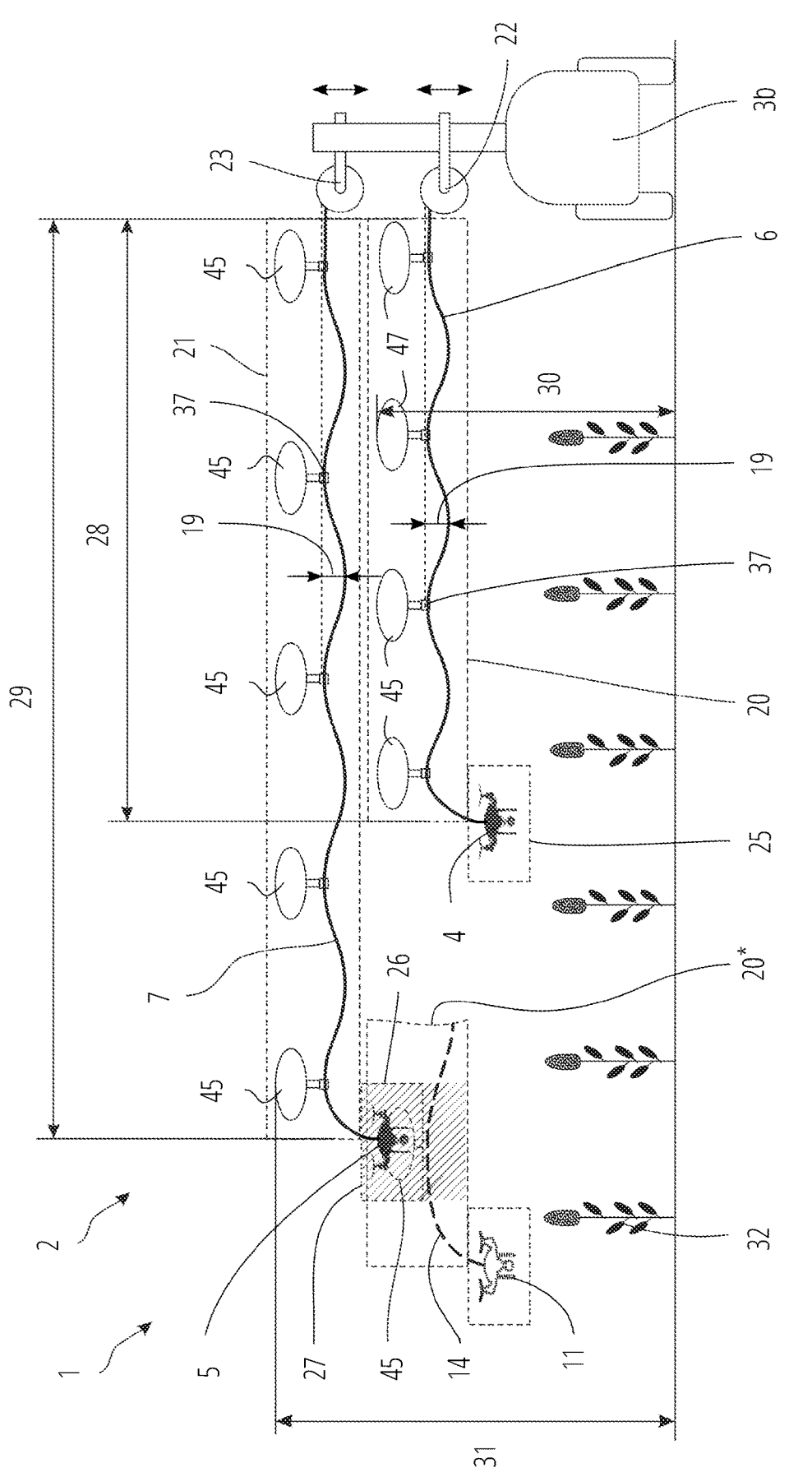
FIG. 8 illustrates a control system for controlling a wired vehicle fleet with safety zones covering UAVs, bendable connection elements and floating units.

FIG. 8 shows a control system 1 similar to FIG. 7 wherein drones (unmanned aerial vehicles) are operating as first and second vehicle 4 and 5. I. e. in contrast to ground-based agricultural vehicles, the drones may fly over the agricultural field 8 to treat the crop 32 and may vary their altitudes. The height of the winch 22 and winch 23 may be adjusted to the corresponding altitude of the first and second vehicle 4 and 5.

Figure 9:
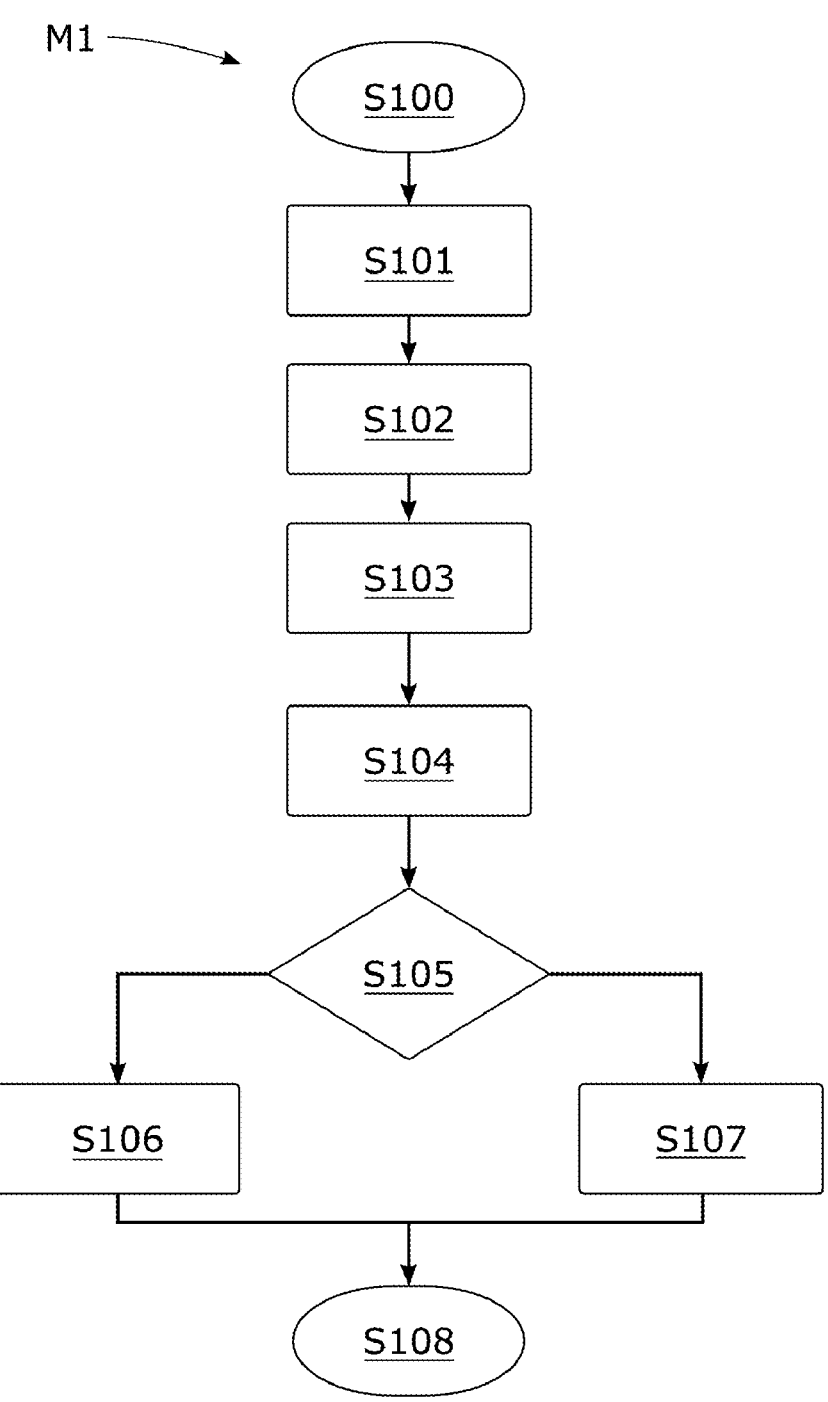
FIG. 9 illustrates a flow diagram for a first method.

FIG. 9 shows a flow diagram of a first method M1. The method M1 may be a computer implemented method and may be carried out by the control unit 40. The method M1 may be part of a wayline planning for vehicle fleet 2 prior to moving on agricultural field 8. The method M1 may be started before one of the moveable supply unit 3b, the first and the second vehicle 4 and 5 approaches the headland 13 of the agricultural field 8. The method M1 works with each control system 1 as shown in FIG. 2, FIG. 4, FIG. 7 and FIG. 8. The method M1 starts with step S100 and proceeds to step S101 for determining a minimum and a maximum height of the first bendable connection element 6. The control unit 40 may determine the height 30 of the distal end 24 of the mast 18 of the first vehicle 4 to determine the maximum height of the first bendable connection element 6. The minimum height may be determined by the slack 19 of the first bendable connection element 6 by the control unit 40. The slack 19 may be calculated by the control unit 40 based on a length of the bendable connection element. The minimum height of the first bendable connection element 6 may be a predefined parameter stored in the memory 44 and retrieved by the control unit 40.

The method proceeds to step S102 for determining a minimum and a maximum height of the second bendable connection element 7. The control unit 40 may determine the minimum and the maximum height of the second bendable connection element 7 based on the height 31 of the distal end 24 of the mast 18 of the second vehicle 5 and the slack 19 of the second bendable connection element 7 analogously to the determination of the first bendable connection element 6 as described above.

The method proceeds to step S103 and the control unit 40 determines a first wayline 9 of the first vehicle 4. As can be seen in FIG. 1 or FIG. 3, the first wayline 9 may be a straight line through the agricultural field 8 and may be parallel to at least one other wayline. The first wayline 9 may be stored in the memory 44 or may be transferred to the first vehicle 4 for guiding the first vehicle 4 along the first wayline 9. Alternatively, the control unit 40 may determine control signals for guiding the first vehicle 4 along the first wayline 9 and may send the control signals to the first vehicle 4. Thus, the first vehicle 4 may travel autonomously along the first wayline 9 for an automated field operation.

In case of a moveable supply unit 3b the method may proceed to step S104. Otherwise the method proceeds to step S105 and S106 or S107 to determine a second wayline of the second vehicle 5.

At step S104, the control unit 40 may determine a third wayline 33 for the moveable supply unit 3b. As can be seen in FIG. 3, the third wayline 33 may be a straight line through the agricultural field 8 and may be parallel to at least one other wayline, e. g. the first wayline 9. The third wayline 33 may be stored in the memory 44. The control unit 40 may determine control signals for guiding the supply unit 3b along the third wayline 33 and may control the moveable supply unit 3b accordingly. Thus, the supply unit 3b may travel autonomously along the third wayline 33 for an automated field operation.

The method proceeds to step S105 and the control unit 40 determines whether the minimum height of the first bendable connection element 6 is higher than the maximum height of the second bendable connection element 7 (first option) or whether the minimum height of the second bendable connection element 7 is higher than the maximum height of the first bendable connection element 6 (second option). Then, the control unit 40 determines a second wayline 10 of the second vehicle 5 depending on the heights of the first and second bendable connection element 6 and 7 so that the first and the second bendable connection elements 6 and 7 won't collide against each other when the first vehicle 4 and the second vehicle 5 travel along their corresponding first and second waylines 9 and 10.

In case of the first option, the method proceeds to step S106 and a wayline extending between the first wayline 9 and the position of the supply unit 3a, 3b will be determined as the second wayline 10 by the control unit 40 as shown in FIG. 1 or FIG. 3. In case of the second option, the method proceeds to step S107 and a wayline extending next to the first wayline 9 but having a greater distance from the supply unit 3a, 3b than the first wayline 9 will be determined as the second wayline 10 by the control unit 40. Thus, the vehicle connected with the bendable connection element having the lower height is guided closer to the supply unit 3a, 3b than the other vehicle connected with the bendable connection element having the greater height.

As can be seen in FIG. 3, the position of the moveable supply unit 3b may be the current position of the supply unit 3b. Alternatively, the position of the moveable supply unit 3b may be defined by the third wayline 33 determined at step S104 and may be an anticipated position 34 of the supply unit 3b.

As can be seen in FIG. 1 or FIG. 3, the second wayline 10 may be a straight line through the agricultural field 8 and may be parallel to at least one other wayline, e. g. the first wayline 9. The second wayline 10 may be stored in the memory 44 or may be transferred to the second vehicle 5 for guiding the second vehicle 5 along the second wayline 10. Alternatively, the control unit 40 may determine control signals for guiding the second vehicle 5 along the second wayline 10 and may send the control signals to the second vehicle 5. Thus, the second vehicle 5 may travel autonomously along the second wayline 10 for an automated field operation.

After step S106 or S107, the method proceeds to step S108 and the first method M1 ends. Finally, the control unit 40 determined a first and a second wayline 9 and 10 for the first and second vehicle 4 and 5 which enable a travel of the first and the second vehicle 4 and 5 through the agricultural field 8 without a collision between the first bendable connection element 6 and the second bendable connection element 7.

Optionally, the first method M1 may be carried out by control unit 40 which may be beyond supply unit 3a, 3b, the first and the second vehicle 4 and 5 to enable off-board wayline planning. The wayline plan may then be communicated to vehicle fleet 2.

Figure 10:
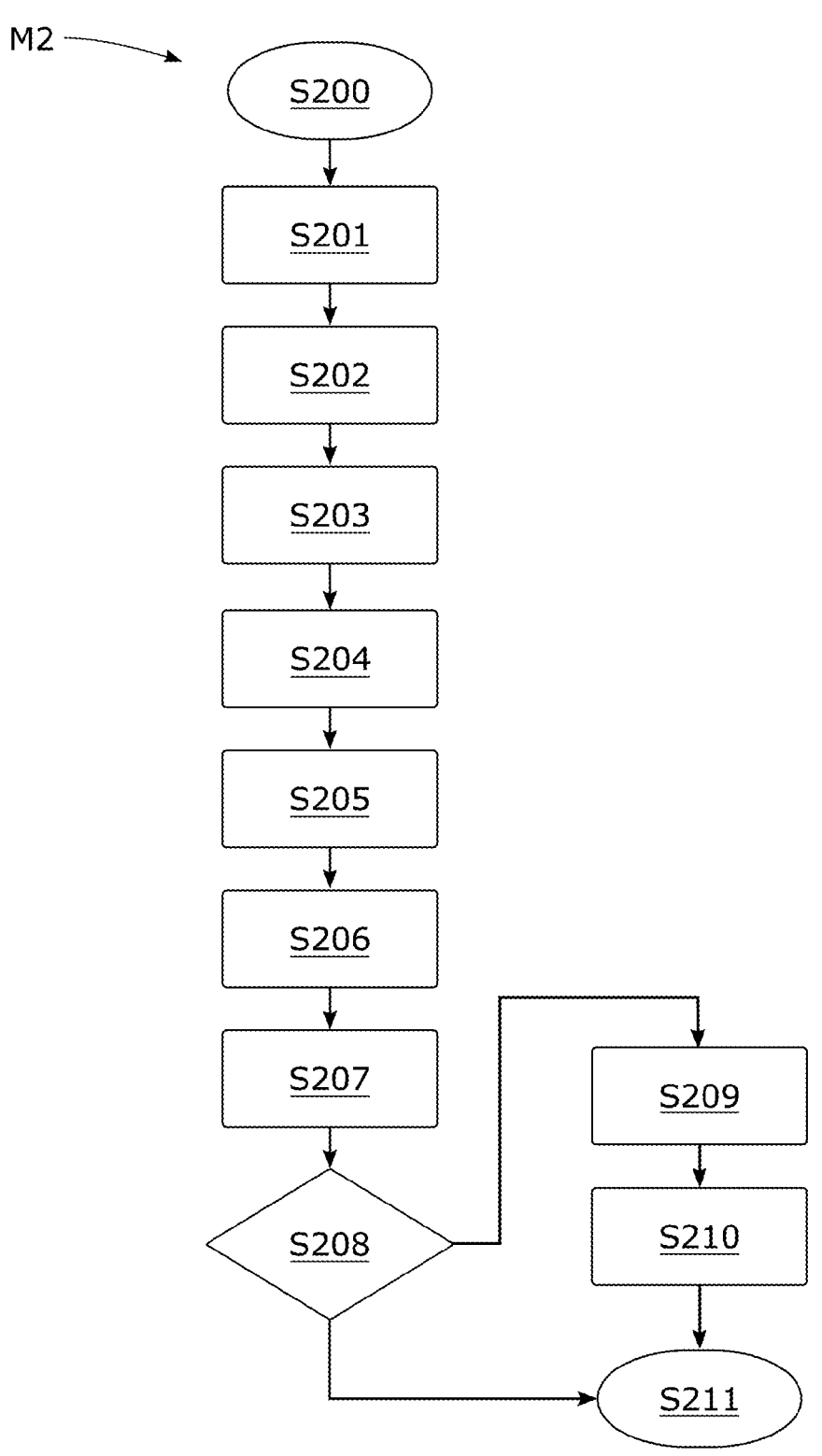
FIG. 10 illustrates a flow diagram for a second method.

FIG. 10 shows a flow diagram of a second method M2. The method M2 may be a computer implemented method and may be carried out by the control unit 40. The method M2 works with each control system 1 as shown in FIG. 2, FIG. 4, FIG. 7 and FIG. 8. The method M2 starts with step S200 and proceeds to step S201 for determining a first wayline 9 of the first vehicle 4. The first wayline 9 may be determined by the control unit 40 analogously to step S103 of method M1.

The method M2 may be part of a collision avoidance system. The first and second waylines 9, 10 may be part of a predetermined wayline planning. The waylines may change during operation, e. g. if the vehicles 4 and 5 are provided with means for obstacle detection and a detected obstacle such as a stone or a tree forces the vehicles 4 or 5 to leave the predetermined wayline.

The method proceeds to step S202 and the control unit 40 determines a second wayline 10 of the second vehicle 5. The second wayline 10 be determined by the control unit 40 analogously to step S106 or S107 of method M1.

The method proceeds to step S203 and the control unit 40 determines a first safety zone 20 in consideration of a length 28 of the first bendable connection element 6 and a minimum and a maximum height of the first bendable connection element 6 as can be seen in FIG. 2 and FIG. 4. The length 28 of the first bendable connection element 6 depends on the distance between the first vehicle 4 and the supply unit 3a, 3b as it is apparent from FIG. 1 to FIG. 4. Since the distance between the first vehicle 4 and the supply unit 3a, 3b may vary the length 28 of the first bendable connection element 6 may vary accordingly. The minimum height of the first bendable connection element 6 depends on the slack 19 of the first bendable connection element 6 as can be seen in FIG. 2 and FIG. 4. The slack 19 may be reduced if the first bendable connection element 6 is attached to the carrier rope 36 by at least a fixation 37 as can be seen in FIG. 4 and FIG. 5. The maximum height of the first bendable connection element 6 may depend on the height 30 of the distal end 24 of the mast 18 of the first vehicle 4 as can be seen in FIG. 2 and FIG. 4. Since the height of the height variable mast 18 is adjustable the maximum height of the first bendable connection element 6 may vary accordingly. The maximum height of the first bendable connection element 6 may depend on the height of the winch 22 of the first bendable connection element 6. Alternatively, the maximum height of the first bendable connection element 6 may depend on a floating height of at least one floating unit 45 attached to the first bendable connection element 6 as can be seen in FIG. 7 and FIG. 8. Thus, the first safety zone 20 determined by the control unit 40 covers the first bendable connection element 6 completely and reaches from the winch 22 of the first bendable connection element 6 to the mast 18 of the first vehicle 4 and from the maximum height to the minimum height of the first bendable connection element 6. So for simplicity, the first safety zone 20 may be shaped as a cuboid. Alternatively, the first safety zone 20 may be determined as a tube or any other solid surrounding the first bendable connection element 6.

The method proceeds to step S204 and the control unit 40 determines a second safety zone 21 in consideration of a length 29 of the second bendable connection element 7 and a minimum and a maximum height of the second bendable connection element 7 as can be seen in FIG. 2 and FIG. 4. The second safety zone 21 may be determined analogously to the first safety zone 20. The length 29 of the second bendable connection element 7 depends on the distance between the second vehicle 5 and the supply unit 3a, 3b as it is apparent from FIG. 1 to FIG. 4. Since the distance between the second vehicle 5 and the supply unit 3a, 3b may vary the length 29 of the second bendable connection element 7 may vary accordingly. The minimum height of the second bendable connection element 7 depends on the slack 19 of the second bendable connection element 7 as can be seen in FIG. 2 and FIG. 4. The slack 19 may be reduced if the second bendable connection element 7 is attached to the carrier rope 36 by at least a fixation 37 as can be seen in FIG. 4 and FIG. 5. The maximum height of the second bendable connection element 7 may depend on the height 31 of the distal end 24 of the mast 18 of the second vehicle 5 as can be seen in FIG. 2 and FIG. 4. Since the height 31 of the height variable mast 18 is adjustable the maximum height of the second bendable connection element 7 may vary accordingly. The maximum height of the second bendable connection element 7 may depend on the height of the winch 23 of the second bendable connection element 7. Alternatively, the maximum height of the second bendable connection element 7 may depend on a floating height of at least one floating unit 45 attached to the second bendable connection element 7 as can be seen in FIG. 7 and FIG. 8. Thus, the second safety zone 21 determined by the control unit 40 covers the second bendable connection element 7 completely and reaches from the winch 23 of the second bendable connection element 7 to the mast 18 of the second vehicle 5 and from the maximum height to the minimum height of the second bendable connection element 7. So for simplicity, the second safety zone 21 may be shaped as a cuboid. Alternatively, the second safety zone 21 may be determined as a tube or any other solid surrounding the second bendable connection element 7.

While the first and the second vehicle 4 and 5, and optionally the supply unit 3b, travel along their waylines 9, 10 and 33 the bendable connection elements 6 and 7 will change their positions. E. g., the first bendable connection element will change its position as indicated by numeral 14 when the first vehicle 4 arrives a vehicle position 11 and the second bendable connection element 7 will change its position as indicated by numeral 15 when the second vehicle 5 arrives a vehicle position 12 (see FIG. 1 and FIG. 3). In addition, the position of the first and second bendable connection elements 6 and 7 depend on the position of the supply unit 3a, 3b regardless whether the supply unit 3a, 3b changes its position, e. g. to a position indicated by numeral 34 (see FIG. 3) or not.

These positional changes of the first and second bendable connection elements 6 and 7 may affect the lengths 28 and 29 and the maximum and the minimum heights of the first and second bendable connection elements 6 and 7 resulting in different variations of the first safety zone 20 of the first bendable connection element 6 and in different variations of the second safety zone 21 of the second bendable connection element 7. As can be seen in FIG. 2 or FIG. 4 for example, if the first vehicle 4 travels from the wayline 16 to the anticipated position 11 the length 28 of the first bendable connection element 6 will be extended as indicated by the bendable connection element 14. Consequently, the first safety zone 20 will be extended to the safety zone 20* to cover the first bendable connection element 6 extended to the bendable connection element 14. I. e., a variation of the first safety zone 20 is defined by the extended safety zone 20*.

Thus, the control unit 40 updates the first and second safety zones 20 and 21 in dependence of the different positions of the supply unit 3b and the first and second vehicle 4 and 5 and determines the corresponding variations of the first and second safety zone 20 and 21 for the different positions.

The method proceeds to step S205 and the control unit 40 anticipates variations of the first safety zone 20 based on anticipated positions 11 of the first vehicle 4 moving along the first wayline 9 (see FIG. 1 to FIG. 4. The anticipated positions 11 of the first vehicle 4 may be determined by the control unit 40 based on the current position of the first vehicle 4, the first wayline 9, the driving speed of the first vehicle 4 and the operation time of the vehicle fleet 2. Then, the anticipated variations of the first safety zone 20 may be determined by the control unit 40 based on the changes of the length 28 and the maximum and the minimum height of the first bendable connection element 6 affected by the anticipated positions 11 of the first vehicle 4.

The method proceeds to step S206 and the control unit 40 anticipates variations of the second safety zone 21 based on anticipated positions 12 of the second vehicle 5 moving along the second wayline 10 analogously to step S205 (see FIG. 1 to FIG. 4). The anticipated positions 12 of the second vehicle 5 may be determined by the control unit 40 based on the current position of the second vehicle 5, the second wayline 10, the driving speed of the second vehicle 5 and the operation time of the vehicle fleet 2. Then, the anticipated variations of the second safety zone 21 may be determined by the control unit 40 based on the changes of the length 29 and the maximum and the minimum height of the second bendable connection element 7 affected by the anticipated positions 12 of the second vehicle 5.

In case of a moveable supply unit 3b (see FIG. 3 and FIG. 4), anticipated positions 34 of the supply unit 3b are needed to be taken into account for the anticipation of the first and second safety zones 20 and 21 since these anticipated positions 34 may also affect the lengths 28 and 29 and the maximum and the minimum heights of the first and the second bendable connection element 6 and 7. Thus, the method proceeds optionally to step S207 and the control unit 40 optionally determines a third wayline 33 of the supply unit 3b and anticipates variations of the first safety zone 20 and the second safety zone 21 based on anticipated positions 34 of the supply unit 3b moving along the third wayline 33. The anticipated positions 34 of the supply unit 3b may be determined by the control unit 40 based on the current position of the supply unit 3b, the third wayline 33, the driving speed of the supply unit 3b and the operation time of the vehicle fleet 2.

Then, the method proceeds to step S208 and the control unit 40 anticipates a collision of the first bendable connection element 6 with the second bendable connection element 7 if an anticipated variation of the first safety zone 20 intersects an anticipated variation of the second safety zone 21. As can be seen in FIG. 2 and FIG. 4 for example, the first safety zone 20 intersects the second safety zone 21 within a collision zone 27 indicating a collision at the same operation time of the vehicle fleet 2.

If a collision is anticipated at step S208, the method proceeds to step S209 and the control unit 40 executes at least one preventive measure to avoid the anticipated collision. For example, a preventive measure may be a determination of an alternative wayline of the movable supply unit 3b. Another preventive measure may be a determination of an alternative wayline of the second vehicle 5. Another preventive measure may be to carry out at least one of the steps S100 to S108 of the first method M1.

The method may optionally proceed to step S210 and the control unit 40 may optionally adjust the height of the first or the second bendable connection element 6 or 7. Step S210 may also be executed as a preventive measure to avoid an anticipated collision. The height of the first or second bendable connection element 6 or 7 can be adjusted by an adjustment of the heights 30 or 31 of the variable mast 18 or by an adjustment of the height of the winch 22 or winch 23. So, the control unit 40 may adjust the height of the first and second bendable connection element 6 or 7 such that the maximum height of the bendable connection element connected with the vehicle being guided closer to the supply unit 3a, 3b is lower than the minimum height of the bendable connection element connected with the other vehicle being guided with a greater distance from the supply unit 3a, 3b.

When the first safety zone 20 is determined by the control unit 40 at step S203 and when the second safety zone 21 is determined by the control unit 40 at step S204 the control unit 40 may optionally consider the size of the first vehicle 4 with respect to the first safety zone 20 and the size of the second vehicle 5 with respect to the second safety zone 21. Thus, the first vehicle 4 may be covered by the first safety zone 20 extended with safety zone 25 and the second vehicle 5 may be covered by the second safety zone 21 extended with safety zone 26. The extended safety zones 25 and 26 may encompass the first and the second vehicle 4 and 5 irrespective of the type of the first and the second vehicle 4 and 5 so that ground-based agricultural vehicles (see FIG. 2, FIG. 4, FIG. 7) may be encompassed as well as drones (see FIG. 8). I. e., the first and the second safety zones 20 and 21 is not restricted to the first and second bendable connection elements 6 and 7 only.

If a collision couldn't be anticipated by the control unit 40 at step S208, the method proceeds to step S211. Finally, the second method M2 ends with step S211.

Both methods M1 and M2 enable the control system 1 to provide a (predictive) wayline plan for collision free travel of the wired vehicle fleet 2 in agricultural field 8 and also enable to avoid collision during the operation of the wired vehicle fleet 2 (with or without a predetermined wayline plan).

All references cited herein are incorporated herein in their entireties. If there is a conflict between definitions herein and in an incorporated reference, the definition herein shall control.

LISTING OF DRAWING ELEMENTS

1 control system
2 vehicle fleet
3a supply unit
3b supply unit
4 first vehicle
5 second vehicle
6 first bendable connection element
7 second bendable connection element
8 agricultural field
9 first wayline
10 second wayline
11 anticipated position
12 anticipated position
13 headland
14 bendable connection element
15 bendable connection element
16 wayline
17 wayline
18 mast
19 slack
20 first safety zone 21 second safety zone
22 winch
23 winch
24 distal end
24 first safety zone (extended)
26 second safety zone (extended)
27 collision zone
28 length
29 length
30 height
31 height
32 crop
33 third wayline
34 anticipated position
35 wayline
36 carrier rope
37 fixation
38 agricultural vehicle
39 implement
40 control unit
41 roof
42 interface
43 controller
44 memory
45 floating unit

What is claimed is:

1. A method for controlling a wired vehicle fleet, the vehicle fleet comprising:

a first vehicle connected with a moveable supply unit for supplying the first vehicle with at least one of electrical energy or fluid by a first bendable connection element; and a second vehicle connected with the moveable supply unit for supplying the second vehicle with at least one of electrical energy of fluid by a second bendable connection element, wherein the first or the second bendable connection element comprises a pipe for supplying a fluid or a wire for transferring electrical energy or a combination of a wire and a pipe, and wherein the method is for avoiding a collision between the first and second bendable connection elements and comprises:

determining a minimum and a maximum height of the first bendable connection element;

determining a minimum and a maximum height of the second bendable connection element;

determining a first wayline of the first vehicle;

determining a second wayline of the second vehicle depending on the heights of the first and second bendable connection elements and based on a path planning algorithm;

determining a third wayline of the moveable supply unit, wherein the location of the moveable supply unit is defined by the third wayline, wherein, if the minimum height of the first bendable connection element is higher than the maximum height of the second bendable connection element, the second wayline runs between the first wayline and the third wayline; and wherein, if the maximum height of the first bendable connection element is lower than the minimum height of the second bendable connection element, the first wayline runs between the second wayline and the third wayline; and causing at least one of the first vehicle to travel along the first wayline or the second vehicle to travel along the second wayline.

2. The method of claim 1, wherein the second wayline runs between the first wayline and a location of the moveable supply unit if the minimum height of the first bendable connection element is higher than the maximum height of the second bendable connection element; and wherein the first wayline runs between the second wayline and the location of the moveable supply unit if the maximum height of the first bendable connection element is lower than the minimum height of the second bendable connection element.

3. A method for controlling a wired vehicle fleet, the vehicle fleet comprising:

a first vehicle connected with a moveable supply unit for supplying the first vehicle with at least one of electrical energy or fluid by a first bendable connection element; and a second vehicle connected with the moveable supply unit for supplying the second vehicle with at least one of electrical energy or fluid by a second bendable connection element, wherein the first or the second bendable connection element is a pipe for supplying a fluid or a wire for transferring electrical energy or a combination of a wire and a pipe;

wherein the method is for avoiding a collision between the first and second bendable connection elements and comprising:

determining a first wayline of the first vehicle;

determining a second wayline of the second vehicle;

determining a first safety zone in consideration of a length of the first bendable connection element and a minimum and a maximum height of the first bendable connection element;

determining a second safety zone in consideration of a length of the second bendable connection element and a minimum and a maximum height of the second bendable connection element;

anticipating variations of the first safety zone based on anticipated variations of the first vehicle moving along the first wayline;

anticipating variations of the second safety zone based on anticipated variations of the second vehicle moving along the second wayline;

anticipating a collision of the first bendable connection element with the second bendable connection element if an anticipated variation of the first safety zone intersects an anticipated variation of the second safety zone; and causing at least one of the first vehicle to travel along the first wayline or the second vehicle to travel along the second wayline.

4. The method of claim 3, further comprising:

determining a third wayline of the moveable supply unit; and anticipating variations of the first safety zone and the second safety zone based on anticipated positions of the moveable supply unit moving along the third wayline.

5. The method of claim 4, further comprising determining an alternative wayline of the moveable supply unit if a collision of the first bendable connection element with the second bendable connection element is anticipated.

6. The method of claim 3, further comprising determining an alternative wayline of the second vehicle if a collision of the first bendable connection element with the second bendable connection element is anticipated.

7. The method of claim 3, further comprising:
if a collision of the first bendable connection element with the second bendable connection element is anticipated, performing the following steps:
   determining a minimum and a maximum height of the first bendable connection element;
   determining a minimum and a maximum height of the second bendable connection element;
   determining a first wayline of the first vehicle; and
   determining a second wayline of the second vehicle depending on the heights of the first and second bendable connection element.

8. The method of claim 3, further comprising adjusting the height of the first or the second bendable connection element.

9. The method of claim 3, wherein—
the first safety zone is determined in consideration of a size of the first vehicle; and
the second safety zone is determined in consideration of a size of the second vehicle.

10. A control system for controlling a wired vehicle fleet, the control system comprising:
a moveable supply unit;
a first vehicle connected with the moveable supply unit for supplying the first vehicle with energy or any other resource by a first bendable connection element;
a second vehicle connected with the moveable supply unit for supplying the second vehicle with energy or any other resource by a second bendable connection element;
wherein the first or the second bendable connection element comprises a pipe for supplying a fluid or a wire for transferring electrical energy or a combination of a wire and a pipe; and
a control unit configured to:
   determine a minimum and a maximum height of the first bendable connection element;
   determine a minimum and a maximum height of the second bendable connection element;
   determine a first wayline of the first vehicle;
   determine a second wayline of the second vehicle depending on the heights of the first and second bendable connection element and based on a path planning algorithm;
   determining a third wayline of the moveable supply unit,
   wherein the location of the moveable supply unit is defined by the third wayline, wherein, if the minimum height of the first bendable connection element is higher than the maximum height of the second bendable connection element, the second wayline runs between the first wayline and the third wayline, and
   wherein, if the maximum height of the first bendable connection element is lower than the minimum height of the second bendable connection element, the first wayline runs between the second wayline and the third wayline; and
   causing at least one of the first vehicle to travel along the first wayline or the second vehicle to travel along the second wayline.

11. The control system of claim 10, further comprising a floating unit for carrying the first or the second bendable connection element in the air.

12. The control system of claim 11, wherein the control unit is configured to determine the maximum height of the first or the second bendable connection element in consideration of a floating height of the floating unit and a size of the floating unit.

13. The control system of claim 11, wherein the floating unit comprises an envelope for enclosing a gas volume.

14. The control system of claim 10, wherein the first or the second bendable connection element is a pipe for supplying a fluid.

15. The control system of claim 10, wherein at least one of the first vehicle, the second vehicle and the supply unit comprises a height variable mast for connecting the first or the second bendable connection element.

16. The control system of claim 15,
the first vehicle comprising a first height variable mast connected with the first bendable connection element for adjusting the maximum height of the first bendable connection element;
the second vehicle comprising a second height variable mast connected with the second bendable connection element for adjusting the maximum height of the second bendable connection element; and
wherein the control unit is configured to adjust the maximum height of each of the first and second bendable connection elements so that the maximum height of the bendable connection element of the one of the first and second vehicle being closer to the supply unit is below the minimum height of the bendable connection element of the other vehicle being more distant from the supply unit.

* * * * *